(12) United States Patent
    Fan et al.

(10) Patent No.: US 10,809,155 B2
(45) Date of Patent: Oct. 20, 2020

(54) METHOD FOR DETECTING PRE-IGNITION OF INTERNAL COMBUSTION ENGINE

(71) Applicant: TSINGHUA UNIVERSITY, Beijing (CN)

(72) Inventors: Qinhao Fan, Beijing (CN); Zhi Wang, Beijing (CN); Yunliang Qi, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 16/624,702

(22) PCT Filed: Nov. 1, 2018

(86) PCT No.: PCT/CN2018/113475
§ 371 (c)(1),
(2) Date: Dec. 19, 2019

(87) PCT Pub. No.: WO2019/157839
PCT Pub. Date: Aug. 22, 2019

(65) Prior Publication Data
US 2020/0225119 A1    Jul. 16, 2020

(30) Foreign Application Priority Data

Feb. 14, 2018   (CN) .......................... 2018 1 0151812

(51) Int. Cl.
    *G01M 15/11*    (2006.01)
    *G01M 15/05*    (2006.01)
(52) U.S. Cl.
    CPC .................... *G01M 15/05* (2013.01)
(58) Field of Classification Search
    USPC ............... 73/35.01, 114.02, 114.04, 114.05
    See application file for complete search history.

(56) References Cited

U.S. PATENT DOCUMENTS

| 5,907,093 A | 5/1999 | Lehmann |
| 6,185,984 B1 | 2/2001 | Takahashi |

(Continued)

FOREIGN PATENT DOCUMENTS

| CN | 1519553 A | 8/2004 |
| CN | 1796754 A | 7/2006 |

(Continued)

OTHER PUBLICATIONS

Office Action for Chinese Patent Application No. 201810151812.4, dated Feb. 25, 2019.

(Continued)

*Primary Examiner* — Eric S. McCall
(74) *Attorney, Agent, or Firm* — Pearl Cohen Zedek Latzer Baratz LLP

(57) ABSTRACT

The invention relates to a method for detecting the pre-ignition of an internal combustion engine comprising: integrating all instantaneous angular accelerations in a feature window to acquire integral values, and judging whether the internal combustion engine is pre-ignited according to the integral values and an pre-ignition threshold in a detection window; the feature window is an angle range corresponding to a top dead center of the compression stroke of the internal combustion engine to 3-5 consecutive signal teeth backward from the top dead center along the rotating direction of a crankshaft; the instantaneous angular accelerations correspond to the signal teeth in the feature window in a one-to-one manner. The method for detecting the pre-ignition of the present application is simple in algorithm and small in amount of calculation, only 3-5 pieces of data in the feature window are required to be numerically integrated, and the abnormal combustion is determined without complicated time-frequency analysis and vibration information reconstruction cylinder pressure; the structure of the (Continued)

internal combustion engine may not need to be modified and the marketization period is short; since the 58-tooth speed sensor is one of the basic configurations of the internal combustion engine, no additional device needs to be added and thus low cost is achieved; and the method has high detection accuracy for both steady-state and transient conditions and also has a good application prospect for the real vehicle environment.

9 Claims, 6 Drawing Sheets

(56) References Cited

U.S. PATENT DOCUMENTS

| | | | |
|---|---|---|---|
| 7,158,875 B2 | 1/2007 | Yasui et al. | |
| 2014/0149020 A1 | 5/2014 | Nakada et al. | |
| 2015/0019112 A1 | 1/2015 | Shiraishi et al. | |
| 2015/0152991 A1 | 6/2015 | Lin | |

FOREIGN PATENT DOCUMENTS

| | | |
|---|---|---|
| CN | 101331305 A | 12/2008 |
| CN | 102817738 A | 12/2012 |
| CN | 102980777 A | 3/2013 |
| CN | 103688042 | 3/2014 |
| CN | 103850852 A | 6/2014 |
| CN | 104126067 A | 10/2014 |
| CN | 108414230 A | 8/2018 |
| DE | 10349883 A1 | 6/2005 |
| JP | H0942039 | 2/1997 |
| JP | 2001082309 | 3/2001 |

OTHER PUBLICATIONS

International Search Report of PCT Application No. PCT/CN2018/113475, dated Jan. 30, 2019.

METHOD FOR DETECTING PRE-IGNITION OF INTERNAL COMBUSTION ENGINE

CROSS-REFERENCE TO RELATED APPLICATION

This application is a National Phase Application of PCT International Application No. PCT/CN2018/113475, International Filing Date Nov. 14, 2018, claiming priority of Chinese Patent Application No. 201810151812.4, filed on Feb. 14, 2018 and entitled "Method for Detecting Pre-Ignition of Internal Combustion Engine", which is incorporated herein by reference in its entirety.

FIELD OF THE INVENTION

The present disclosure relates to the field of diagnosis and control of the combustion of an internal combustion engine, and in particular to a method for detecting the pre-ignition of internal combustion engines.

BACKGROUND OF THE INVENTION

Internal combustion engines are the leading power of vehicles, vessels, construction machinery and defense equipment. Pre-ignition is an important potential cause of conventional knocking and super-knocking of internal combustion engines. Once continuous pre-ignition occurs, the internal combustion engines are highly likely to be damaged. The cause of the pre-ignition includes mainly two aspects: 1) structural heat points; and 2) unstructured heat points. The structural heat points are mainly meant that protruding structures inside a combustion chamber form sharp points of heat during the combustion process within a cylinder, thereby becoming fixed ignition sources. These structural heat points are mainly controlled by optimizing the structure of a combustion system, enhancing the local cooling, and reducing the thermal load inside the cylinder. The unstructured heat points refer to engine oil peeled off from the wall of the cylinder, metal debris, deposits within the cylinder and the like. When the unstructured heat points are heated and retained within the cylinder during the previous cycle, the next cycle will be ignited in advance. With the continuous increase in the degree of intensifying the internal combustion engines (higher power density), the problem of pre-ignition has become increasingly prominent.

Methods for the pre-ignition detection and suppression adopted by domestic and foreign research institutes and automobile enterprises mainly include such control strategies as detection based on the strength of ion current signals, pressure signal detection of pre-ignition-induced knocking or super-knocking based on a knocking sensor or cylinder pressure sensor, detection of a pre-ignition time based on the multi-order derivative of instantaneous rotational speed, detection based on vibration signals or the adjustment of the effective compression ratio, fuel injection, ignition, cooling intensity, recirculation of exhaust gas based on the real-time state of the internal combustion engine and the like.

However, existing algorithms for pre-ignition diagnostic methods are complicated or have poor practicality. Due to the limitations of costs, product designs, sensor layout spaces and the like, the pre-ignition diagnosis may be generally performed on the real vehicle environment based only on existing on-board sensors, such as a knocking sensor, a cooling water temperature sensor, a 58-tooth speed sensor, etc. But the knocking sensor is ineffective for the pre-ignition detection of anti-knocking fuels (such as methanol, ethanol, and natural gas) and the cooling water temperature sensor is low in signal response speed, and thus the abnormal combustion cannot be effectively monitored in real time.

SUMMARY OF THE INVENTION

In view of the deficiencies of the prior art, the present disclosure provides a method for detecting the pre-ignition of an internal combustion engine, which has such advantages of small signal processing amount, simple algorithm, high practicability and low cost and can effectively detect pre-ignition without adding devices additionally.

The object above is achieved by the following technical solution.

According to an embodiment of the present disclosure, a method for detecting the pre-ignition of an internal combustion engine may include: integrating all instantaneous angular accelerations in a feature window to acquire integral values, and judging whether the internal combustion engine is pre-ignited according to the integral values and an pre-ignition threshold in a detection window; the feature window is an angle range corresponding to a top dead center of the compression stroke of the internal combustion engine to 3-5 consecutive signal teeth backward from the top dead center along the rotating direction of a crankshaft; the instantaneous angular accelerations correspond to the signal teeth in the feature window in a one-to-one manner.

The method for detecting the pre-ignition has small signal processing amount, simple algorithm, high pre-ignition detection effectiveness in both the steady-state test and transient test, insensitiveness to working conditions and high practicability, and may be applied to both bench test and real vehicle environment.

The feature window may be an angle range corresponding to a top dead center of the compression stroke of the internal combustion engine to 4 consecutive signal teeth backward from the top dead center along the rotating direction of a crankshaft. This may provide the most comprehensive and more accurate representation of the pressure difference features between a pre-ignition cycle and a normal combustion cycle.

Preferably, a method for acquiring the instantaneous angular accelerations may include firstly acquiring instantaneous rotational speeds of the internal combustion engine through a 58-tooth speed sensor, then pre-processing the instantaneous rotational speeds to acquire corrected instantaneous rotational speeds including abnormal combustion information, finally taking the first-order derivation of the corrected instantaneous rotational speeds, to obtain the instantaneous angular accelerations.

The 58-tooth speed sensor may be a magnetoelectric or Hall sensor.

According to the technical solution above, since the 58-tooth speed sensor is one of the basic configurations of the internal combustion engine, no additional device needs to be added and the structure of the internal combustion engine does not need to be modified when using the detection method above, and thus both low cost and short marketization period are achieved. Since the instantaneous rotational speeds of the internal combustion engine acquired by the 58-tooth speed sensor will drown some abnormal combustion information due to relatively low signal to noise ratio in raw data, the instantaneous rotational speeds are to be corrected to make it closer to the actual data result.

Preferably, the sampling frequency of the 58-tooth speed sensor is not less than 100 kHz.

According to the technical solution above, high sampling frequency may ensure that a sufficient angular resolution of instantaneous rotational speeds is acquired in the speed range of the internal combustion engine and provide a data basis for using a double moving average method.

Preferably, the pre-processing may be performed using a combustion analyzer or a tooth-picking method in combination with the double moving average method.

During the bench test, the pre-processing may be performed using the combustion analyzer to acquire the instantaneous rotational speeds including abnormal combustion information due to absence of constraints such as space limitation; under the real vehicle environment, in order to save the cost and spaces, no additional device is added and the pre-processing may be performed using the tooth-picking method in combination with the double moving average method to acquire the instantaneous rotational speeds including abnormal combustion information.

Preferably, the double moving average method may be a processing method of "interpolation-moving average-grouped space average-moving average", wherein the moving average is an arithmetic average of two current data and respective two contiguous data in the front and behind the current data, and meanwhile the time that every 6-degree crank angle undergoes is corrected using the double moving average method.

Through being corrected using the tooth-picking method and the double moving average method above, the corrected instantaneous rotational speeds includes abnormal combustion information and have a sinusoidal-like characteristic and the time that every 6-degree crank angle undergoes, having been corrected using the double moving average method, may provide the basis for the subsequent acquirement of accurate instantaneous angular accelerations.

Preferably, the integral interval used in the integrating is an incremental arithmetic progression including positive real numbers. Using the incremental arithmetic progression including positive real numbers as the integral interval, pre-ignition features can be intuitively extracted through the integrating, and the effect of the unevenness of the increment of integral objects on integral results may be eliminated using the arithmetic progression. For ease of calculation, a natural progression of 1 to 5 may be set.

Preferably, the pre-ignition threshold in the detection window may be an arithmetic average of the integral values corresponding to 10 cycles ahead of the current cycle.

The regulations for the above-mentioned pre-ignition threshold can be appropriately adjusted. According to the specific definition above, it is relatively reliable to judge the pre-ignition result using the detection method.

Preferably, if no pre-ignition occurs within 10 cycles ahead of the current cycle, the pre-ignition threshold may be an arithmetic average of the integral values corresponding to 10 cycles ahead of the current cycle; if the pre-ignition occurs within 10 cycles ahead of the current cycle, the pre-ignition threshold may be an arithmetic average of the integral values corresponding to 10 cycles ahead of this pre-ignition cycle.

According to the technical solution above, the pre-ignition threshold is continuously updated, and the updating rule is as follows: if the pre-ignition occurs during the current cycle, the updating ends, and the lastly updated pre-ignition threshold is still adopted by the pre-ignition detection in the 10 cycles subsequent to the current cycle; If no pre-ignition occurs within the above 10 cycles, the updating of the pre-ignition threshold is restarted until the next pre-ignition cycle is detected, and so on. Continuously updating the pre-ignition threshold can ensure the real-time of the pre-ignition detection, reject the integral value during the abnormal pre-ignition cycle and simultaneously control that the length of the detection window is invariant.

Preferably, a criterion of the judging is that it is judged to be pre-ignition when the integral value exceeds 2.5 times of the pre-ignition threshold.

During the steady-state and transient processes, the critical judging criterion of the pre-ignition can be adjusted appropriately. 2.5 times is the judging criterion that can take into account different working conditions and the setting condition of this criterion will affect the recognition accuracy of the pre-ignition cycle. Therefore, the judging criterion can be appropriately adjusted in the actual application process to further improve the effectiveness of the pre-ignition detection.

Compared with the prior art, the present disclosure has the following beneficial effects:

(1) The algorithm of pre-ignition measurement index is simple, the amount of calculation is small, 3-5 data in the feature window are only need to be numerically integrated and the abnormal combustion is determined without complicated time-frequency analysis and vibration information reconstructing cylinder pressure.

(2) The structure of the internal combustion engine need not to be modified and the marketization period is short. Since the 58-tooth speed sensor is one of the basic configurations of the internal combustion engine, no additional device needs to be added and thus low cost is achieved.

(3) The correction accuracy of the rotational speed is high, the method is simple and the abnormal combustion information contained in the rotational speed can be effectively restored.

(4) The method has high detection accuracy for both steady-state and transient working conditions and has a good application prospect for the real vehicle environment.

---

The descriptions of reference numbers

Figure 1:
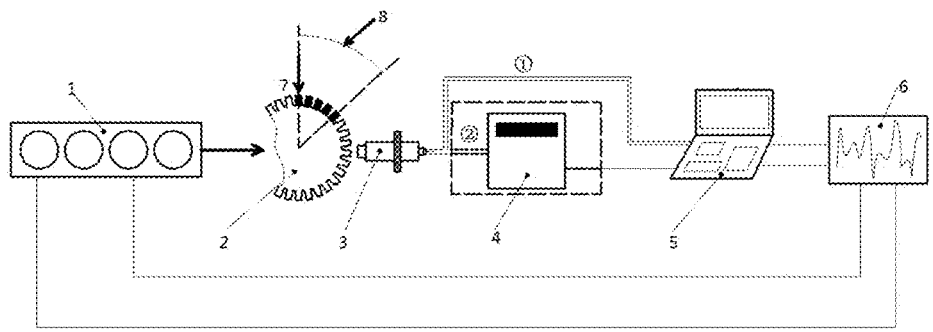
FIG. 1 is a schematic diagram of an arrangement of a test device and a feature window.

1 - internal combustion engine
2 - flywheel ring gear
3 - 58-tooth speed sensor
4 - combustion analyzer
5 - ECU in which algorithms are recorded
6 - control strategy
7 - top dead center of compression stroke
8 - feature window

---

DETAILED DESCRIPTION OF THE EMBODIMENTS INVENTION

Hereinafter, the implementations of the present disclosure are further explained in detail in conjunction with the accompanying drawings and embodiments. The following embodiments are merely used for illustrating the present application and are not intended to limit the scope of the present disclosure.

Embodiment 1

The present embodiment provides a method for detecting the pre-ignition of an internal combustion engine. The arrangement of a detection device thereof is as shown in FIG. 1. Firstly, instantaneous rotational speed original signals of a flywheel ring gear 2 in the internal combustion engine 1 are acquired through a 58-tooth speed sensor 3, and then the instantaneous rotational speed original signals are processed to acquire an instantaneous rotational speeds including abnormal combustion information, the first-order derivation of the instantaneous rotational speed is taken to acquire an instantaneous angular acceleration, all instantaneous angular accelerations in the feature window 8 are extracted and integrated to acquire integral values, and the integral values are compared with the pre-ignition threshold of the detection window to determine whether the internal combustion engine 1 is pre-ignited. The algorithm is integrated in the ECU 5. The control strategy 6 is adopted and fed back to the internal combustion engine 1 if the pre-ignition occurs.

The feature window 8 may be an angle range corresponding to a top dead center 7 of the compression stroke of the internal combustion engine 1 to 4 consecutive signal teeth backward from the top dead center 7 along the rotating direction of a crankshaft.

Under the real vehicle environment ①, the pre-processing may be performed using a tooth-picking method in combination with a double moving average method; and during the bench test ②, the pre-processing may be performed using the combustion analyzer 4.

Figure 2:
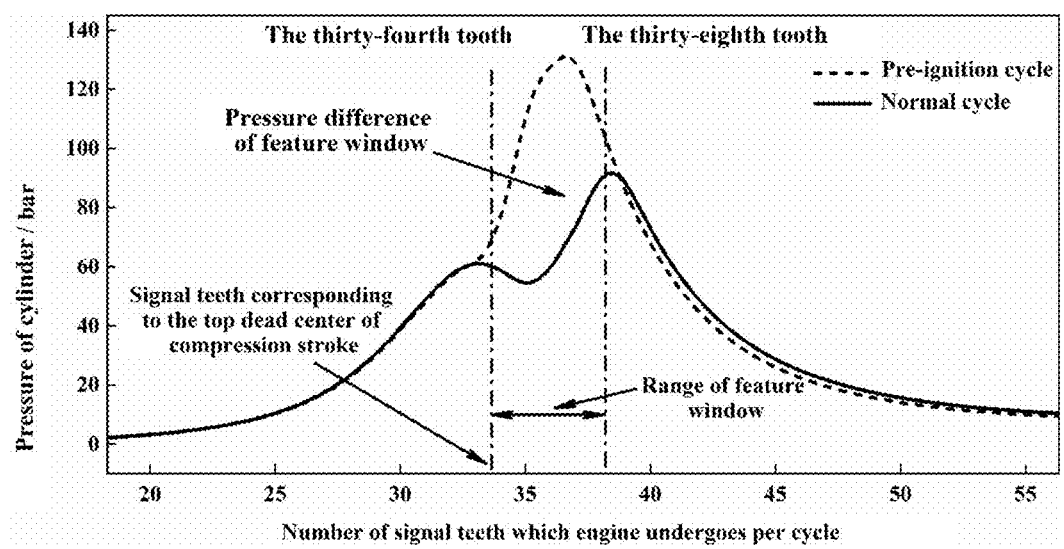
FIG. 2 is a comparison diagram of pressures of a normal combustion cycle and a pre-ignition cycle within the feature window.

FIG. 2 shows a comparison result of pressures between normal combustion and pre-ignition within the feature window. It can be seen that the peak pressure of the cylinder in the pre-ignition cycle in the feature window is much higher than that of the normal cycle. Hereinafter, the size of the peak pressure of the cylinder is used to characterize whether the pre-ignition occurs in the current cycle.

Figure 3:
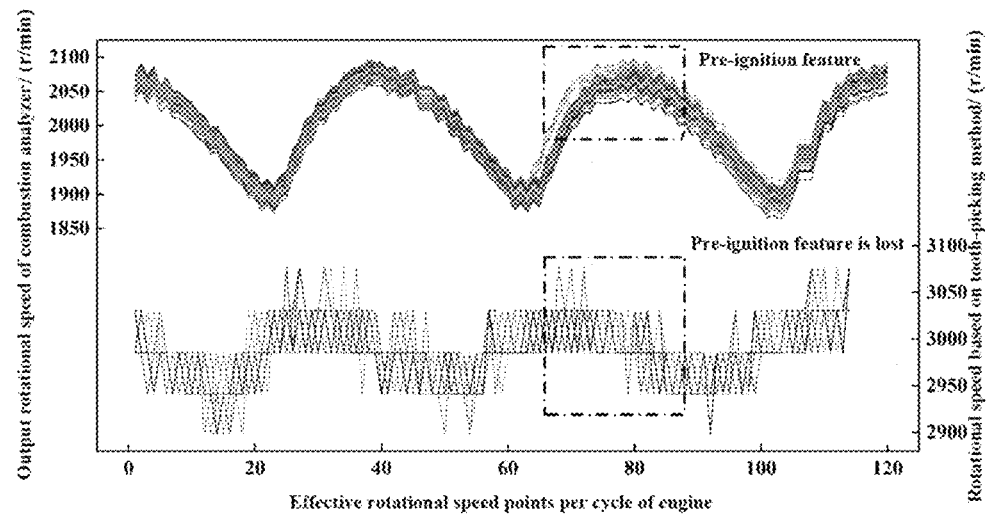
FIG. 3 is a comparison diagram between instantaneous rotational speeds outputted by a combustion analyzer and results processed by a tooth-picking method.

FIG. 3 shows results of the rotational speeds outputted by the combustion analyzer and results of the rotational speeds processed by the tooth-picking method. It can be seen that the abnormal combustion information is lost in the rotational speeds only processed by the tooth-picking method and thus the rotational speeds acquired based on the tooth-picking method are to be further corrected.

Figure 4:
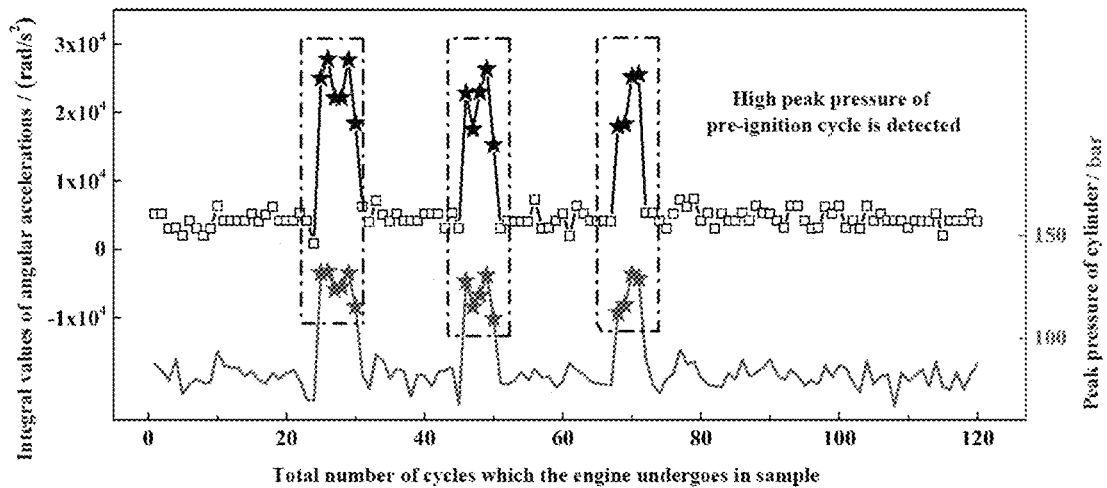
FIG. 4 is a diagram showing the effect of the pre-ignition detection based on the method of the present disclosure using the instantaneous rotational speeds outputted by a combustion analyzer.

FIG. 4 shows that the pre-ignition cycle can be accurately identified by applying the method for extracting the instantaneous angular accelerations within the feature window on rotational speed information output by the combustion analyzer, wherein the integral object is a natural progression of 1 to 5. It can be seen from the figure that the pre-ignition cycle at the high peak pressure is effectively detected.

In conjunction with FIGS. 3 and 4, it is also demonstrated that really restoring the abnormal combustion information contained in the rotational speeds is important. Therefore, under the real vehicle environment, the instantaneous rotational speed original signals are preprocessed by using the tooth-picking method in combination with a double moving average method according to the present embodiment. The double moving average method means a processing method of "interpolation-moving average-grouped space average-moving average" on an original signal, which is applied to the correction of the instantaneous rotational speed original signals and the average time corresponding to every 6-degree crank angle, thereby changing the current state in which effective combustion information in the original signals is lost due to the defect of lower angular resolution. The moving average is an arithmetic average of current data and respective two contiguous data in the front and behind the current data. By taking an array a containing 50 elements as an example, after performing moving average, the array is a*:

$$a^*(1) = a(1)$$

$$a^*(2) = \frac{a(1) + a(2) + a(3)}{3}$$

$$a^*(3) = \frac{a(1) + a(2) + a(3) + a(4) + a(5)}{5}$$

$$a^*(4) = \frac{a(2) + a(3) + a(4) + a(5) + a(6)}{5}$$

$$\ldots$$

$$a^*(47) = \frac{a(45) + a(46) + a(47) + a(48) + a(49)}{5}$$

$$a^*(48) = \frac{a(46) + a(47) + a(48) + a(49) + a(50)}{5}$$

$$a^*(49) = \frac{a(48) + a(49) + a(50)}{3}$$

$$a^*(50) = a(50)$$

Figure 5:
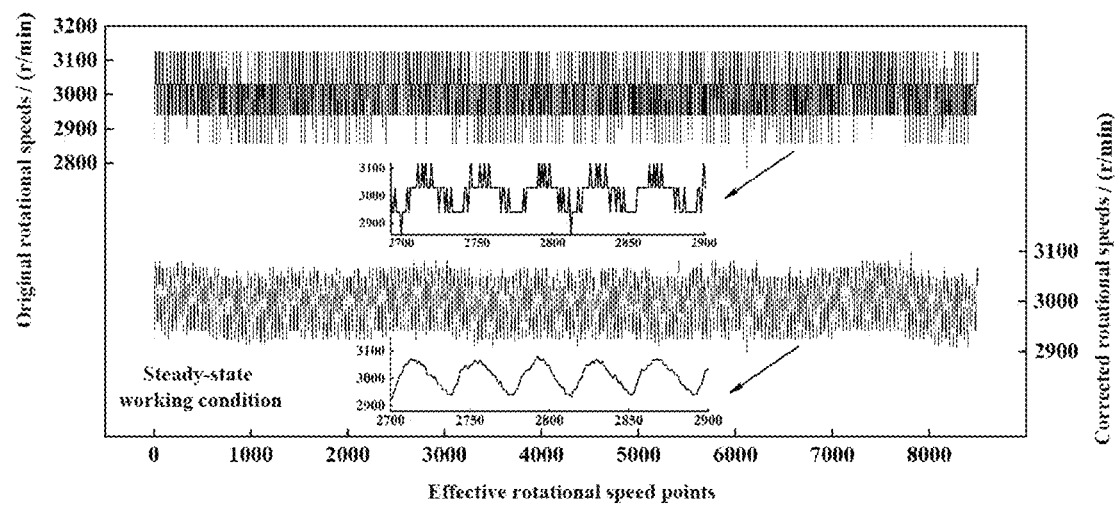
FIG. 5 is a diagram showing the correction effect of a double moving average method on the results processed by the tooth-picking method under a steady-state working condition.
Figure 6:
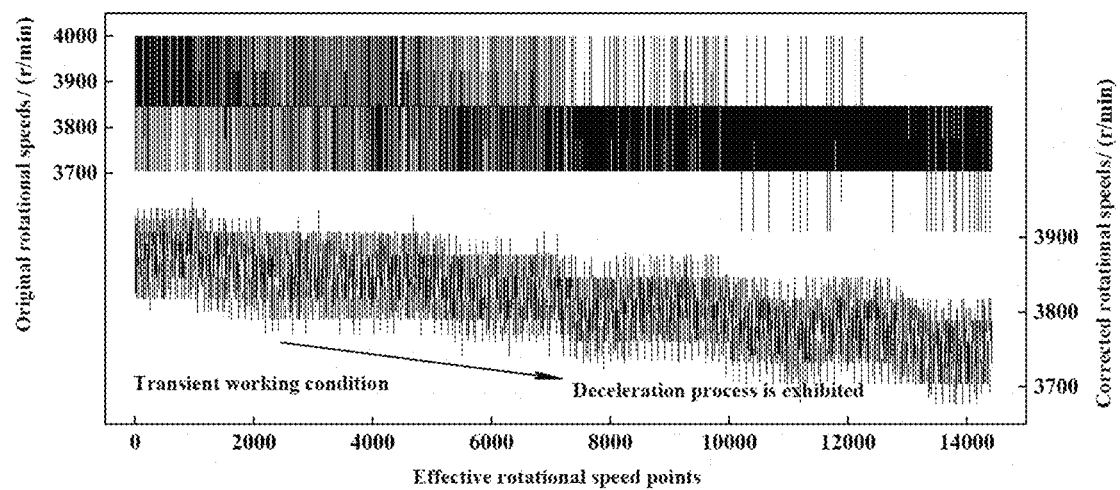
FIG. 6 is a diagram showing the correction effect of a double moving average method on the results processed by the tooth-picking method under a transient working condition.

The effectiveness of the method above was verified under a steady-state working condition of 3000 r/min and a transient working condition of 6400 r/min to 3000 r/min, respectively. The results are shown in FIGS. 5 and 6. FIG. 5 shows the effect of correcting the original rotational speeds acquired based on the tooth-picking method using the double moving average method under the steady-state condition of 3000 r/min. Generally, the rotational speeds of the internal combustion engine have the fluctuation of less than 100 r/min and exhibit sinusoidal-like fluctuations around the target rotational speed under a steady-state working condition, and the original rotational speeds have characteristics above after being corrected. FIG. 6 shows the effect of correcting the original rotational speeds acquired based on the tooth-picking method using the double moving average method under the transient condition and is one portion of a transient process in which the internal combustion engine decelerates from 6400 r/min to 3000 r/min. It can be seen that the corrected rotational speeds well exhibit continuity of the deceleration process and conform to the real physical situation.

Figure 7:
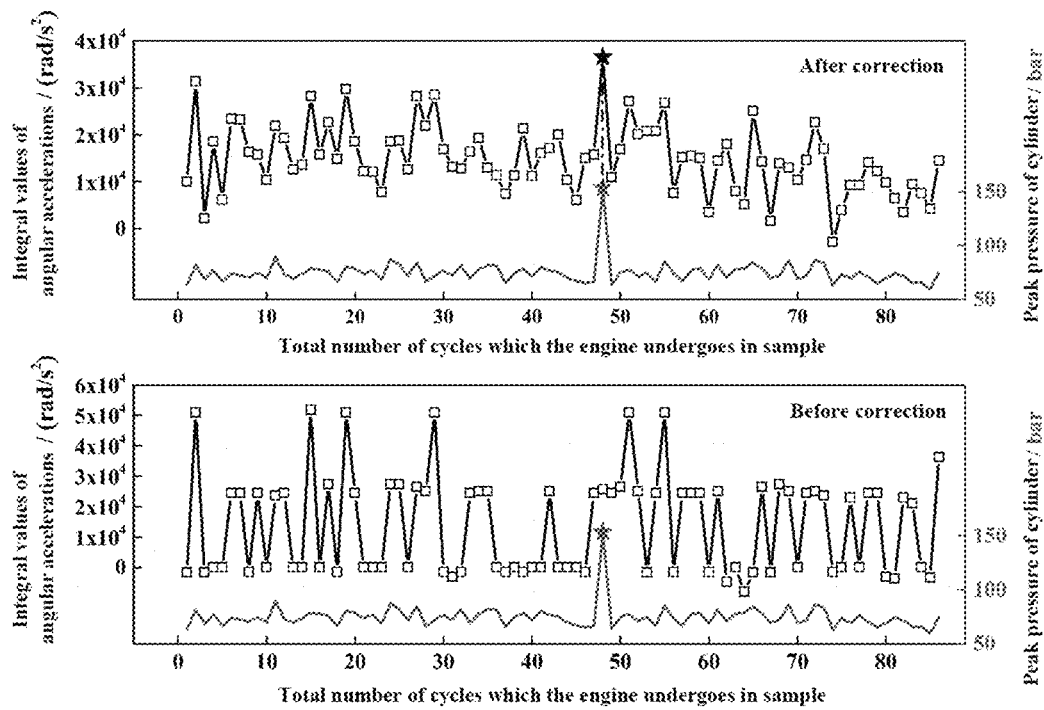
FIG. 7 is a comparison diagram showing the effects of the pre-ignition detection based on the method of the present disclosure before and after the correction of the rotational speeds under a steady-state working condition.
Figure 8:
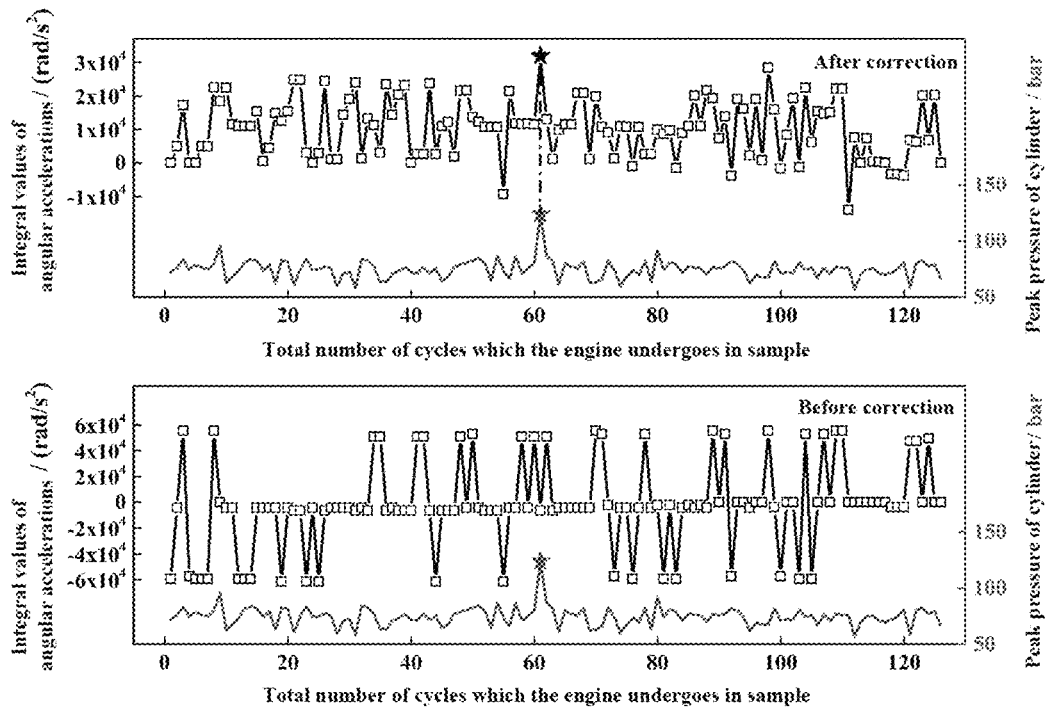
FIG. 8 is a comparison diagram showing the effects of the pre-ignition detection based on the method of the present disclosure before and after the correction of the rotational speeds under a transient working condition.

FIGS. 7 and 8 show the comparison between effects of the pre-ignition diagnosis using the feature extraction of the instantaneous angular accelerations before and after the correction of the rotational speeds under above-mentioned steady-state and transient working conditions, respectively. It can be seen that before the correction of the rotational speeds, no pre-ignition information can be identified, and the pre-ignition features are drowned, which indicates that the signal-to-noise ratio of the original rotational speed signals is relatively low. After being corrected using the double moving average method, the pre-ignition cycle is accurately found under two working conditions. In addition, it can be seen that the pre-ignition under steady-state and transient conditions causes the peak pressure of the cylinder to reach 150 bar, which far exceeds the peak pressure during normal combustion. If the pre-ignition occurs continuously, it will seriously threaten the structural stability of the internal combustion engine. It is very necessary to identify the pre-ignition online and take torque-limiting measures without pressure signal conditions (e.g. real vehicle environment).

Figure 9:
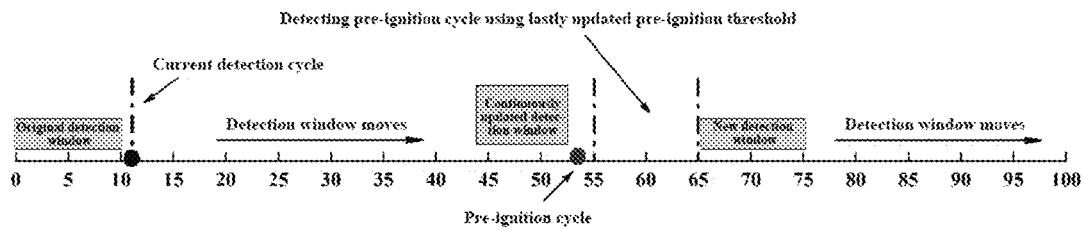
FIG. 9 is a schematic diagram showing detection windows and the updating of the pre-ignition threshold.

Hereinafter, the capability of the present method to recognize the pre-ignition cycle will be verified using a sliding detection window under the condition of no pressure signal. FIG. 9 is a schematic diagram showing sliding detection windows and the updating of the pre-ignition threshold, where the length of the detection window is 10 and the pre-ignition threshold is the arithmetic average of the instantaneous angular acceleration integral values of 10 cycles ahead of the current cycle. The detection window continuously moves as the cycle proceeds and the pre-ignition threshold is continuously updated. If the current cycle is a pre-ignition cycle, the updating ends and the lastly updated pre-ignition threshold is still adopted by the pre-ignition detection in 10 cycles subsequent to the current cycle; if no pre-ignition occurs within the above 10 cycles, the updating of the pre-ignition threshold is restarted until the next pre-ignition cycle is detected.

Figure 10:
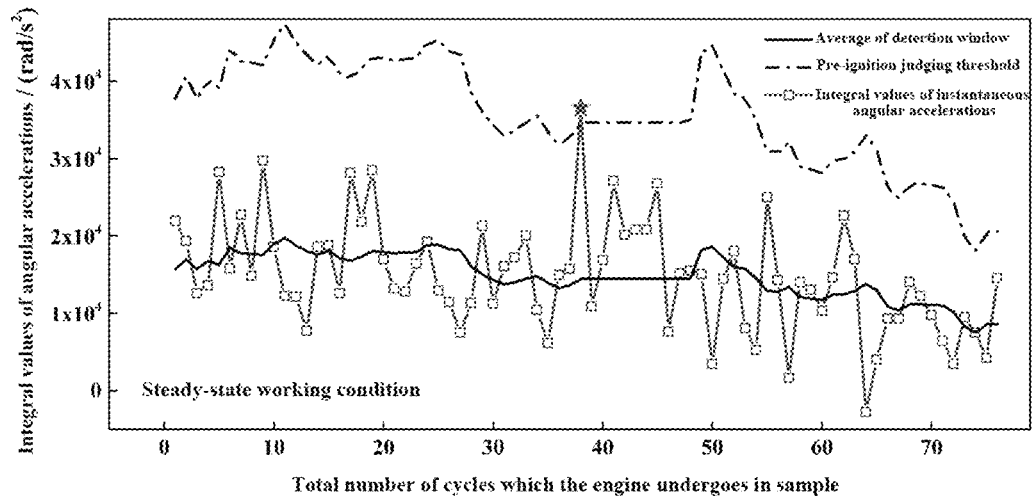
FIG. 10 is a diagram showing the validation of effectiveness of the pre-ignition detection according to the pre-ignition judging criterion under a steady-state working condition.
Figure 11:
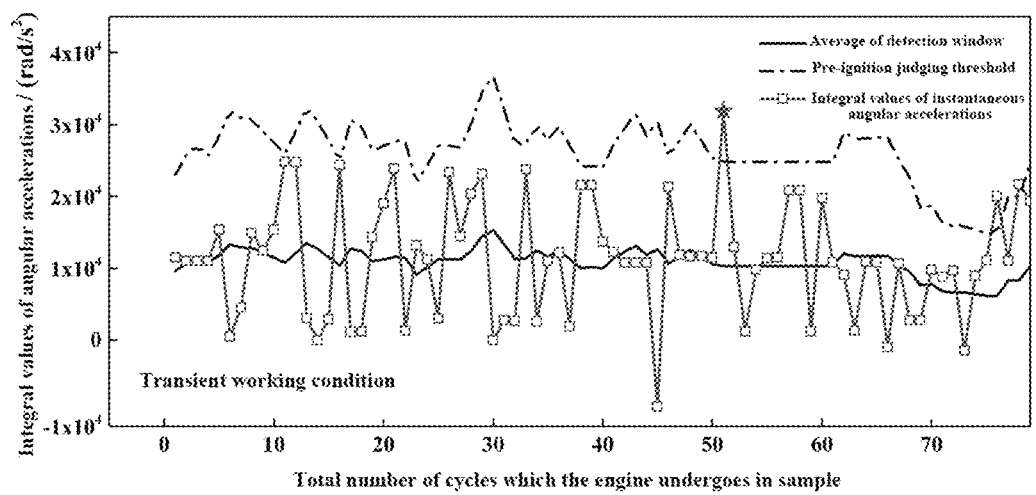
FIG. 11 is a diagram showing the validation of effectiveness of the pre-ignition detection according to the pre-ignition judging criterion under a transient working condition.

Based on the detection window generation method above, 2.5 times of the pre-ignition threshold is taken as the judging criterion to verify the effectiveness of the pre-ignition detection under the steady-state working condition of 3000 r/min and transient working condition of 6400 r/min to 3000 r/min with no pressure signals and the results are shown in FIGS. 10 and 11. FIGS. 10 and 11 show the detection effects of the pre-ignition using the detection window and the pre-ignition threshold defined by FIG. 9 under the condition of no cylinder pressure, respectively. It can be seen that although the method has excellent recognition capability to pre-ignition under steady-state and transient working conditions, the integral value exceeding 2.5 times of the pre-ignition threshold as the judging criterion has larger margin for the steady-state working condition but just meets the requirement of the pre-ignition detection under the transient working condition. Therefore, the judging criterion can be appropriately adjusted in the actual application process to further improve the effectiveness of the pre-ignition detection.

Figure 12:
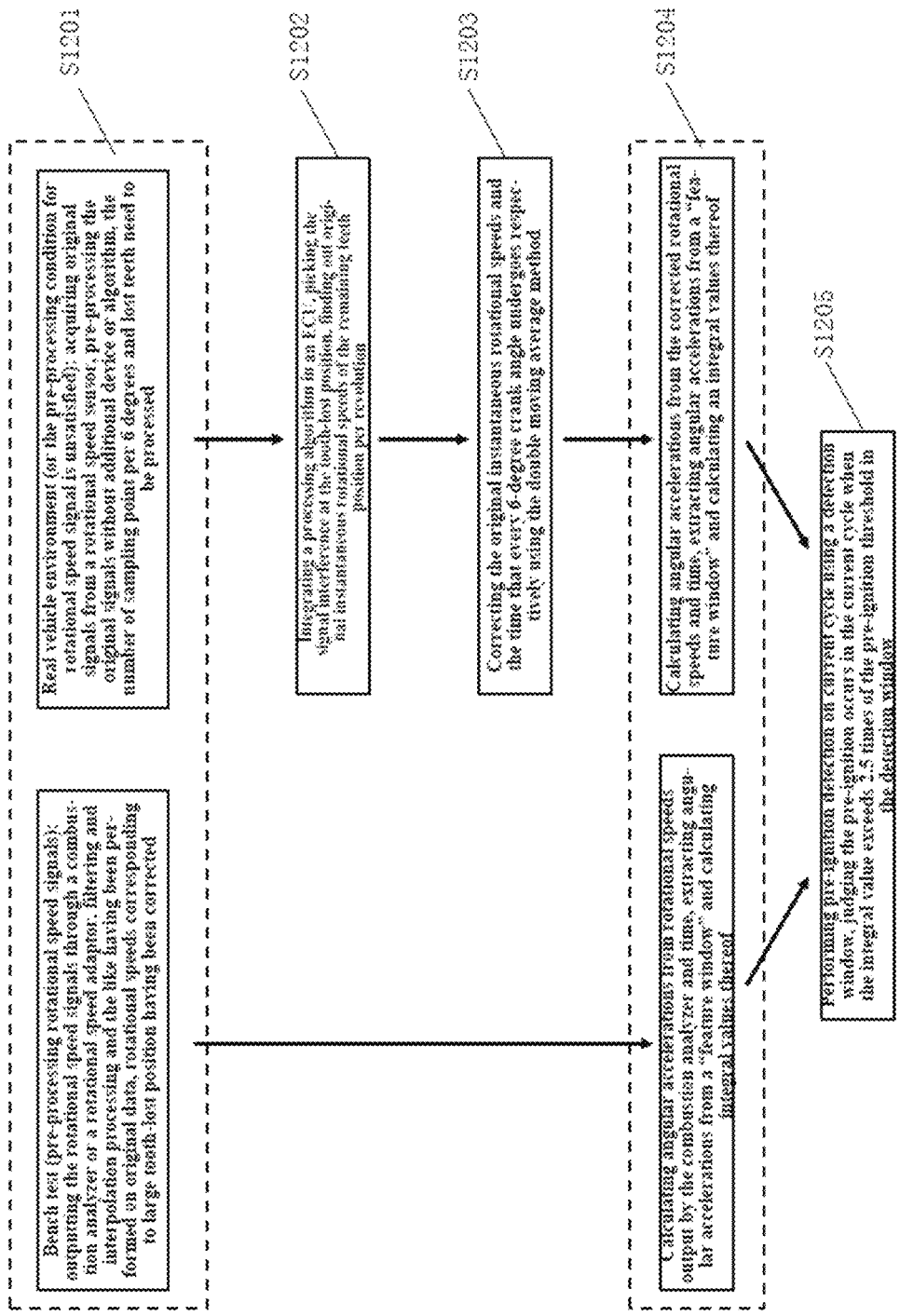
FIG. 12 is a flow chart of detecting the pre-ignition based on the feature extraction of instantaneous angular accelerations under two test conditions according to an embodiment.

FIG. 12 is a flow chart of detecting the pre-ignition based on the feature extraction of instantaneous angular accelerations under two test conditions. FIGS. 3 and 4 show the effectiveness of the present method when step S1201 of FIG. 12 satisfies pre-processing condition and simultaneously verify the necessity of correcting the rotational speeds when it does not satisfy the pre-processing condition; FIGS. 5 and 6 show the results obtained by completing steps S1202 and S1203 in FIG. 12 under the steady-state working condition of 3000 r/min and transient working condition of 6400 r/min to 3000 r/min and the instantaneous rotational speeds in conformity with the actual physical characteristics are acquired; FIGS. 4, 7 and 8 show the results obtained by completing step S1204 in FIG. 12 according to an embodiment of the present disclosure; using the definition and updating of the detection window and the pre-ignition threshold in FIG. 9, FIGS. 10 and 11 show the results obtained by completing step S1205 in FIG. 12 according to an embodiment of the present disclosure, and the pre-ignition cycle can be effectively captured without a pressure signal. In summary, each step of the process for detecting the pre-ignition in FIG. 12 has been verified, which proves that the present disclosure is accurate and simple, no need to change the structure of the internal combustion engine or to add any device. The present application provides a reference for detecting the pre-ignition cycle under the real vehicle environment and has good industrial prospects.

Finally, the above are only preferred embodiments of the present disclosure and are not intended to limit the scope of the present disclosure. Any modifications, equivalent substitutions, improvements, etc. without departing from the spirit and principle of the present disclosure are intended to be included within the scope of the present disclosure.

What is claimed is:
1. A method for detecting the pre-ignition of an internal combustion engine, comprising:
    integrating all instantaneous angular accelerations in a feature window to acquire integral values, and
    judging whether the internal combustion engine is pre-ignited according to the integral values and a pre-ignition threshold in a detection window;
    wherein the feature window is an angle range corresponding to a top dead center of the compression stroke of the internal combustion engine to 3-5 consecutive signal teeth backward from the top dead center along the rotating direction of a crankshaft;
    wherein the instantaneous angular accelerations correspond to the signal teeth in the feature window in a one-to-one manner; and
    wherein acquiring the instantaneous angular accelerations includes:
        first acquiring instantaneous rotational speeds of the internal combustion engine through a 58-tooth speed sensor,
        then pre-processing the instantaneous rotational speeds to acquire corrected instantaneous rotational speeds including abnormal combustion information, and
        finally taking the first-order derivation of the corrected instantaneous rotational speeds.

2. The method for detecting the pre-ignition of the internal combustion engine of claim 1, wherein an integral interval used in the integrating is a positive real-number incremental arithmetic progression.

3. The method for detecting the pre-ignition of the internal combustion engine of claim 1, wherein the feature window is an angle range corresponding to the top dead center of the compression stroke of the internal combustion engine to 4 consecutive signal teeth backward from the top dead center along the rotating direction of the crankshaft.

4. The method for detecting the pre-ignition of the internal combustion engine of claim 2, wherein the sampling frequency of the 58-tooth speed sensor is not less than 100 kHz.

5. The method for detecting the pre-ignition of the internal combustion engine of claim 2, wherein the pre-processing is performed using a combustion analyzer or a tooth-picking method in combination with a double moving average method.

6. The method for detecting the pre-ignition of the internal combustion engine of claim 5, wherein the double moving average method is a processing method of "interpolation-moving average-grouped space average-moving average", wherein the moving average is an arithmetic average of current data and respective two contiguous data in the front and behind the current data, and meanwhile the time that every 6-degree crank angle undergoes is corrected using the double moving average method.

7. The method for detecting the pre-ignition of the internal combustion engine of claim 1, wherein the pre-ignition threshold in the detection window is an arithmetic average of the integral values corresponding to 10 cycles ahead of the current cycle.

8. The method for detecting the pre-ignition of the internal combustion engine of claim 7, wherein:
   if no pre-ignition occurs within 10 cycles ahead of the current cycle, the pre-ignition threshold is an arithmetic average of the integral values corresponding to 10 cycles ahead of the current cycle; and
   if the pre-ignition occurs within 10 cycles ahead of the current cycle, the pre-ignition threshold is an arithmetic average of the integral values corresponding to 10 cycles ahead of a pre-ignition cycle.

9. The method for detecting the pre-ignition of the internal combustion engine of claim 8, wherein a criterion of the judging is that it is judged to be pre-ignition when the integral value exceeds 2.5 times of the pre-ignition threshold.

* * * * *